United States Patent
Fijimoto et al.

Patent Number: 6,135,677
Date of Patent: *Oct. 24, 2000

[54] INDEXABLE END MILL AND INDEXABLE INSERT

[75] Inventors: Katsuhiro Fijimoto, Ikeda; Munenori Nakazaki, Amagasaki, both of Japan

[73] Assignee: Dijet Industrial Co., Ltd, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/096,495

[22] Filed: Jun. 12, 1998

[30] Foreign Application Priority Data

Oct. 23, 1997 [JP] Japan .................................. 9-291074

[51] Int. Cl.⁷ ...................................................... B23B 27/16
[52] U.S. Cl. .................................. 407/42; 407/54; 407/65; 407/114
[58] Field of Search ................................. 407/35, 40, 42, 407/54, 65, 113, 114, 115, 116

[56] References Cited

U.S. PATENT DOCUMENTS

| | | |
|---|---|---|
| 4,132,493 | 1/1979 | Hosoi . |
| 4,525,110 | 6/1985 | Stojanovski . |
| 4,527,930 | 7/1985 | Harroun . |
| 4,679,968 | 7/1987 | Tsujimura et al. ....................... 407/114 |
| 5,017,055 | 5/1991 | Tsujimura et al. ..................... 407/42 X |
| 5,193,943 | 3/1993 | Kim . |
| 5,348,426 | 9/1994 | Krupp ........................................ 407/40 |
| 5,562,370 | 10/1996 | Vogel et al. ............................... 407/42 |
| 5,782,589 | 7/1998 | Cole ...................................... 407/54 X |

FOREIGN PATENT DOCUMENTS

| | | |
|---|---|---|
| 0 123 887 | 11/1984 | European Pat. Off. . |
| 91 07 615 | 10/1991 | Germany . |
| 64-52613 | 3/1989 | Japan . |

*Primary Examiner*—Henry W. H. Tsai
*Attorney, Agent, or Firm*—Armstrong, Westerman, Hattori, McLeland & Naughton

[57] ABSTRACT

An indexable end mill according to the invention includes an end mill body with a round distal end portion and an indexable insert mounted to the end mill body as protruded from the round distal end portion thereof, the indexable insert formed with an end face by cutting away its end portion at a rotation center of cutting edges of the indexable insert, the end face having an edge closer to the end mill body extended outwardly from the rotation center as inclined rearwardly with respect to a line L orthogonal to an axis of the end mill body.

4 Claims, 4 Drawing Sheets

INDEXABLE END MILL AND INDEXABLE INSERT

BACKGROUND OF THE INVENTION

1. Field of the Invention

The present invention generally relates to an indexable end mill wherein an indexable insert is mounted to a round distal end portion of an end mill body as protruded from the end mill body and also relates to the indexable insert mounted to the indexable end mill.

2. Description of the Related Art

As one type of cutting tool, there has conventionally been employed an indexable end mill arranged such that, as shown in FIG. 1, an indexable insert 2 is mounted to a round distal end portion of an end mill body 1 as protruded from the end mill body 1.

As shown in FIGS. 1 and 2, the prior-art indexable insert mounted to the distal end portion of such an end mill body 1 has a substantially elliptical shape in plan, including a mounting hole 2b defined at a center of its cutting face 2a for mounting the indexable insert 2 to the end mill body 1 by means of a screw 3, and two cutting edges 2c each formed in an arcuate shape.

The indexable end mill with the indexable insert 2 protruded from the end mill body 1 has been used for cutting a workpiece (not shown) in a manner such that the indexable end mill is rotated with the indexable insert 2 pressed against the workpiece thereby cutting the workpiece from the top like a drill.

In order to perform the cutting work by means of the indexable insert 2, which is pressed against the workpiece as protruded from the distal end portion of the end mill body 1, it is common practice in the art to form end faces 2d at opposite ends of the indexable insert 2 where the two cutting edges 2c intersect each other. That is, each end face 2d is formed by cutting away an end portion of the cutting face 2a corresponding to a rotation center of the indexable end mill rotated for cutting the workpiece, the cut-away portion being in a bent form extended from a place corresponding to the rotation center of the end mill body. The indexable insert 2 is arranged such that chip removed by the cutting edge 2c at a rotation-center portion of the indexable insert is guided along the end face 2d to the cutting face 2a for discharge.

Unfortunately, when the indexable end mill is cutting the workpiece as pressed thereagainst, the chip removed by the cut-away portion of the insert of the indexable insert 2 disposed substantially on the rotation axis of the end mill is held by a face 2e rising from the end face 2d to the cutting face 2a so that the cut-away portion of the indexable insert 2 becomes blocked with the removed chip which, in turn, is fused thereto.

If, in this state, the indexable end mill is kept rotating for the cutting work, the indexable insert 2 is subject to an excessive load, resulting in a breakage thereof or a reduced cutting performance thereof which lowers the cutting precision of the end mill. As a result, the end mill cannot ensure stability and high precision of the cutting work.

SUMMARY OF THE INVENTION

The present invention is directed to a solution to the aforementioned problem of the indexable end mill arranged such that the indexable insert is mounted to the round distal end portion of the end mill body as protruded from the end mill body.

An object of the invention is to provide an indexable end mill adapted to facilitate discharge of chips produced by cutting a workpiece thereby to prevent the resultant chips from being fused to a rotation-center portion of an indexable insert protruded from an end mill body, in cases where the indexable end mill is rotated with the indexable insert pressed against the workpiece for cutting the workpiece from the top like a drill.

Another object of the invention is to provide an indexable end mill adapted to reduce load on the indexable insert during the cutting work thereby to prevent a breakage thereof or reduced cutting performance of the indexable end mill, thus ensuring stability and high precision of the cutting work.

In accordance with the invention, the indexable end mill comprises an end mill body having a round distal end portion and an indexable insert mounted to the end mill body as protruded from the round distal end portion thereof, wherein an end face is formed by cutting away an end portion a cutting edge of the indexable insert disposed substantially on the rotation axis of the end mill, the end face having an edge closer to the end mill body extended outward from the rotation axis as inclined rearwardly with respect to a line L orthogonal to an axis of the end mill body.

When the indexable end mill employing the aforementioned indexable insert, which is protruded from the distal end portion of the end mill body, is rotated with the indexable insert pressed against the workpiece for cutting the workpiece from the top, the chip removed by the cutting edge at the cut-away portion of the indexable insert is smoothly discharged along the aforesaid end face.

In this indexable end mill, the end face of the indexable insert has an edge closer to the end mill body inclined rearwardly with respect to the line L orthogonal to the axis of the end mill body and therefore, unlike the prior-art configuration of the indexable insert, the face rising from the edge of the end face is prevented from holding the chip removed by the cutting edge at the rotation-center portion of the indexable insert. Hence, the removed chip is discharged along the end face so that the cut-away portion of the indexable insert is prevented from becoming blocked with the removed chip.

Hence, the indexable end mill according to the invention assuredly prevents the removed chip from being fused to the cut-away portion of the indexable insert. As a result, there occurs no breakage of the indexable insert due to an excessive load thereon during the cutting work nor reduction in the cutting performance of the indexable insert which results in a lowered cutting precision. Thus, the indexable end mill ensures a stable cutting work of high precision even where the workpiece is cut from top as done by the drill.

As to the arrangement wherein the end face of the indexable insert has the edge closer to the end mill body rearwardly inclined with respect to the line L orthogonal to the axis of the end mill body, if the rearward inclination of the edge is at an insufficient angle θ, the face rising from the edge of the end face tends to hold the chip removed by the cutting edge at the rotation-center portion of the indexable insert, interfering with the discharge of the removed chip. If, on the other hand, the rearward inclination of the edge is at an excessive angle θ, the face rising from the edge of the end face is spaced too far from the cutting edge so that this rising face fails to suitably brake the removed chip into small chips by colliding therewith, leaving the removed chip growing in length and hence, a discharge failure of the removed chip results. For this reason, it is preferred that the edge closer to the end mill body is rearwardly inclined at an angle θ of between 10° and 60° with respect to the line L orthogonal to the axis of the end mill body.

These and other objects, advantages and features of the invention will become apparent from the following description taken in conjunction with the accompanying drawings which will illustrate a specific embodiment of the invention.

DESCRIPTION OF THE PREFERRED EMBODIMENT

Now, an indexable end mill and an indexable insert according to an embodiment of the invention will hereinbelow be described in detail with reference to the accompanying drawings.

Figure 1:
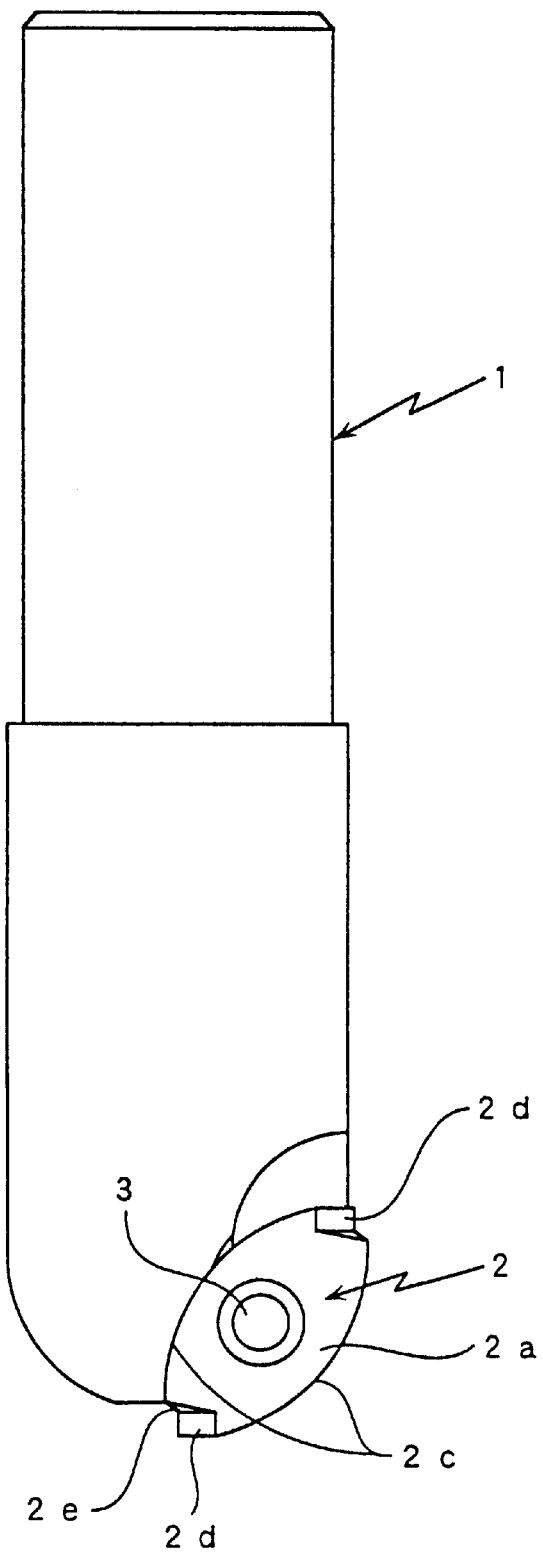
FIG. 1 is a schematic diagram for illustrating a prior-art indexable end mill.
Figure 2:
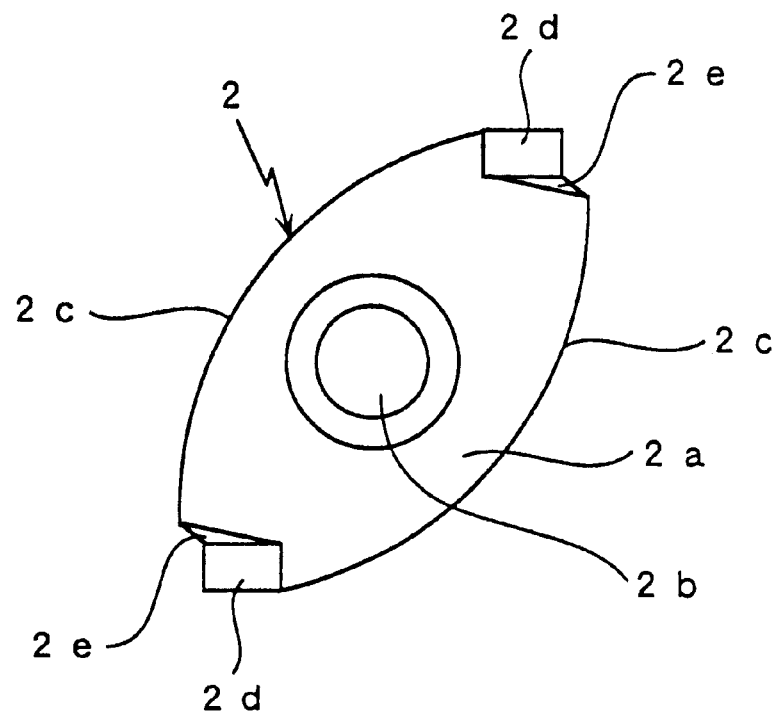
FIG. 2 is a plan view showing an indexable insert for use in the prior-art indexable end mill.
Figure 3:
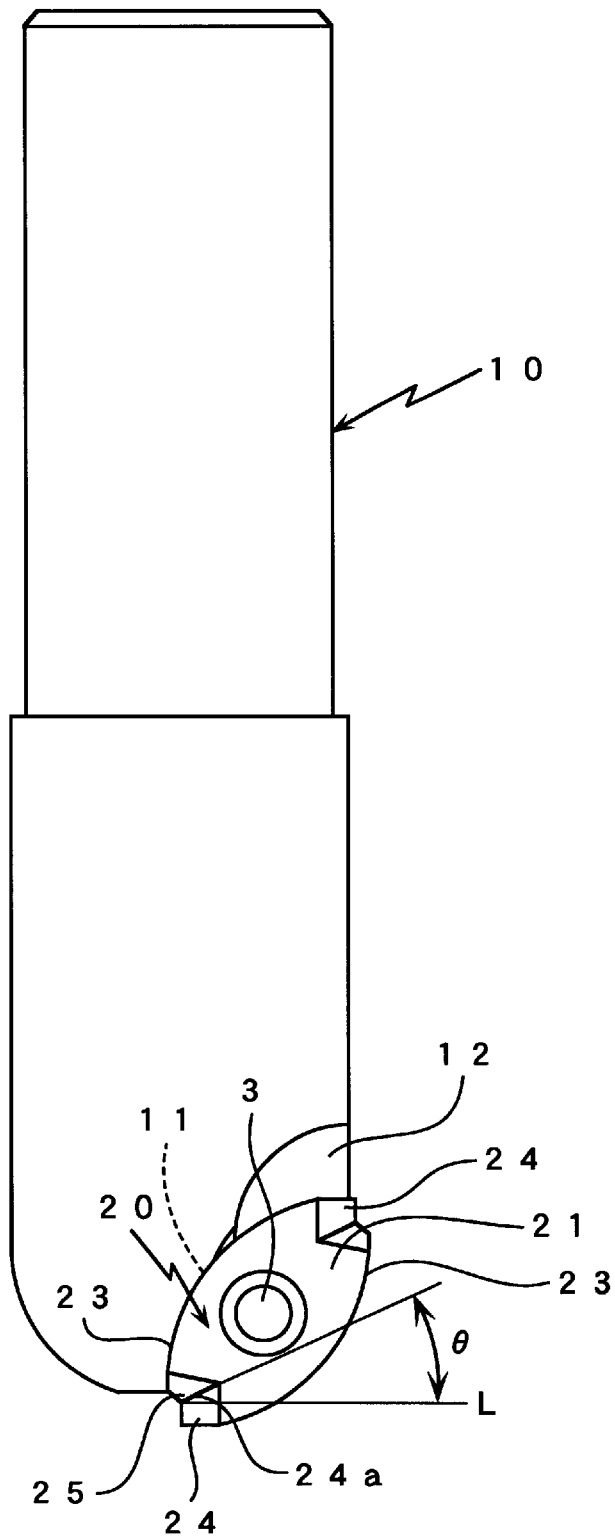
FIG. 3 is a schematic diagram for illustrating an indexable end mill according to an embodiment of the invention.

As shown in FIG. 3, the indexable end mill according to the embodiment of the invention includes an insert seat 11 for mounting an indexable insert 20 to a round distal end portion of an end mill body 10, and a pocket 12 continuous to the insert seat 11 for receiving chips.

Figure 4:
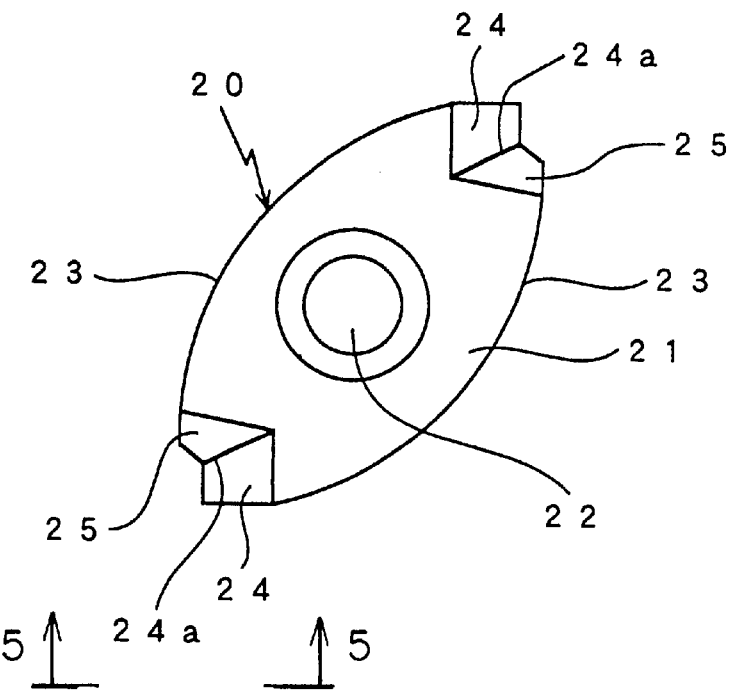
FIG. 4 is a plan view showing an indexable insert for use in the indexable end mill according to the above embodiment of the invention.
Figure 5:
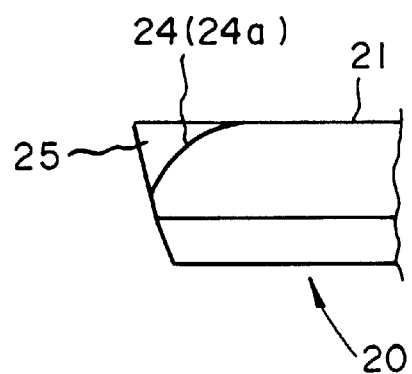
FIG. 5 is a partial end view taken along line 5—5 of FIG. 4.

On the other hand, the indexable insert 20 mounted to the insert seat 11 at the distal end portion of the end mill body 10 is, as shown in FIGS. 3 and 4, substantially elliptically shaped in plan and formed with a mounting hole 22 at a central portion of a cutting face 21 thereof for mounting the indexable insert 20 to the insert seat 11 of the end mill body 10 by means of a screw 3. The indexable insert 20 is further formed with two cutting edges 23 arcuately extending along an outer circumference of the indexable insert. It is to be noted here that the two cutting edges 23 are arcuately formed along the outer circumference of the indexable insert in order that when one of the cutting edges 23 is worn out due to the cutting work, the indexable insert 20 mounted to the end mill body 10 is rotated 180° so as to allow the use of the other cutting edge 23.

The indexable insert 20 is formed with end faces 24 that are convexly bent at opposite ends thereof where the two cutting edges 23 intersect each other. More specifically, each end face 24 is formed by correspondingly cutting away a portion of the cutting face in a bent form such as projected from a portion of the indexable insert 20 disposed substantially of the end mill rotation axis to the cutting face 21 of the insert, the indexable insert being rotated for the cutting work as mounted to the insert seat 11 of the end mill body 10.

In this indexable insert 20, the end face 24 has an edge 24a closer to the end mill body 10 extended outwardly from the rotation axis thereof as inclined rearwardly at an angle θ of 10°–60° with respect to a line L orthogonal to the axis of the end mill body 10.

When the indexable end mill with this indexable insert 20 mounted thereto and protruded from the distal end portion of the end mill body 10 is rotated with the indexable insert 20 pressed against a top of a workpiece thereby cutting the workpiece from the top like a drill, chip removed by the cutting edge 23 at the cut-away portion of the indexable insert 20 is prevented from being held by a face 25 rising from the edge 24a of the end face 24 to the cutting face 21, thus being smoothly guided along the end face 24 to the cutting face 21 for discharge.

Hence, in the indexable end mill according to the embodiment of the invention, the chip removed by the cutting edge 23 at the cut-away portion of the indexable insert is prevented from being held by, and fused to, the rotation-center portion of the indexable insert 20. This is also effective to avoid an excessive load on the indexable insert 20 during the cutting work, which excessive load results in a breakage or reduced cutting performance of the indexable insert 20, which has been suffered by the prior-art end mill. Thus, the indexable end mill of the invention ensures stability and high precision of the cutting work even where the workpiece is cut from the top as done by a drill.

Although the present invention has been fully described by way of example, it is to be noted that various changes and modifications will be apparent to those skilled in the art. Therefore, unless otherwise such changes and modifications depart from the scope of the present invention, they should be construed as being included therein.

What is claimed is:

1. An indexable end mill comprising an end mill body having a round distal end portion containing an insert seat recessed therein and adapted to be rotated about an axis of rotation, and an indexable insert mounted in said insert seat in the end mill body to protrude from the round distal end portion thereof;

wherein the insert has a cutting face with a peripheral side formed as an arcuate cutting edge containing an end face formed by cutting away an end portion of said cutting edge disposed substantially at the center of rotation of the end mill body; and wherein the end face cut into said insert is defined by a pair of surfaces intersecting with each other along an edge extending outwardly from the rotation center of said end mill body and being inclined rearwardly with respect to a line (L) orthogonal to the axis of rotation of the end mill body, one of said pair of surfaces being most protruded from said round distal end portion of said end mill body and having a bent form extending convexly from an end positioned adjacent the rotation axis of said end mill body to an end intersecting said insert cutting face, and the other of said pair of surfaces being defined by a face rising divergently from said intersecting edge of said surfaces.

2. An indexable end mill as set forth in claim 1, wherein said end face has the edge defined by the intersection of said surfaces inclined rearwardly at an angle (θ) of 10° to 60° with respect to the line (L) orthogonal to the rotation axis of the end mill body.

3. An indexable insert for mounting in an insert recess in a round distal end portion of an end mill body adapted to be rotated about an axis of rotation, said insert comprising an insert body having a cutting face with a peripheral side formed as an arcuate cutting edge containing an end face formed by cutting away an end portion of the cutting edge to be disposed at said axis of rotation of the end mill body, wherein the end face cut into said insert is defined by a pair of surfaces intersecting with each other along an edge disosed to extend outwardly from the rotation axis of said end mill body and being inclined rearwardly with respect to a line (L) set to be orthogonal to said rotation axis of the end mill body, one of said pair of surfaces to be most protruded from said round distal end portion of said end mill body having a bent form extending convexly from an end to be positioned adjacent the rotation axis of said end mill body to an end intersecting said insert cutting face, and the other of said pair of surfaces being defined by a face rising divergently from said intersecting edge of said surfaces.

4. An indexable insert as set forth in claim 3, wherein said end face has the edge defined by the intersection of said surfaces inclined rearwardly at an angle ($\theta$) of 10° to 60° with respect to the line (L) when it is disposed orthogonal to the rotation axis of the end mill body.

* * * * *